July 29, 1969  K. W. KREISELMAIER  3,458,361
FUEL CELL ELECTRODE COMPRISING SINTERED POROUS BODY
IMPREGNATED WITH BARIUM OXIDE
Filed March 31, 1966

INVENTOR
KURT W. KREISELMAIER
*E. Mickey Hobbard*
ATTORNEY

United States Patent Office 3,458,361
Patented July 29, 1969

3,458,361
FUEL CELL ELECTRODE COMPRISING SINTERED POROUS BODY IMPREGNATED WITH BARIUM OXIDE
Kurt W. Kreiselmaier, Dallas, Tex., assignor to Texas Instruments Incorporated, Dallas, Tex., a corporation of Delaware
Filed Mar. 31, 1966, Ser. No. 539,030
Int. Cl. H01m 27/04
U.S. Cl. 136—120                    2 Claims This invention relates generally to electrode catalysts, and more particularly relates to catalysts for use in the fuel or oxidant electrodes of a fuel cell.

A fuel cell produces electrical energy from the chemical combination of hydrogen and oxygen to produce water. A fuel cell typically includes an air or oxidant electrode and a fuel or hydrogen electrode separated by a porous media containing an electrolyte. A catalyst is usually present in the fuel electrode at the interface between the electrolyte and the gaseous fuel stream as well at the interface between the catalyst and the oxidant in the oxidant electrode. As a result of the catalyst, oxygen ions are produced in the electrolyte at the oxidant electrode and are recombined with hydrogen ions at the fuel electrode to produce water and a potential difference between the electrodes which will cause a current to flow through a lead connected across the electrodes.

Catalysts usable in fuel cells may be categorized generally by operating temperature range. The most commonly used catalysts utilizable between 25° C. and 100° C. are the expensive noble metals, platinum and palladium. Special high surface area alloys such as Raney nickel, an alloy of nickel and aluminum, are also effective in this temperature range. Since these materials owe a great measure of their high activity to their high surface areas, they are very susceptible to loss of performance due to sintering processes which can occur at temperatures as low as 80° C., and Raney nickel must be electrochemically activated below 65° C. It is quite likely that high current densities produce local heating and sintering effects which cause a significant decrease in performance of these catalysts during use.

The chief catalyst used between 100° C. and 250° C. is nickel oxide, which is used in the Bacon cell. Since pure nickel oxide has a low conductivity, it must be doped with lithium oxide which imparts semiconductive properties to the nickel oxide. Relatively pure hydrogen is also needed in this type of cell for best long term performance because nickel oxide has the added disadvantage of being readily poisoned by carbon monoxide gas.

Nickel and zinc oxide are the two catalysts most commonly used between 400° C. and 700° C. Nickel oxide again suffers from the disadvantage of being poisoned by carbon monoxide, and has to be doped with lithium oxide to increase its electrical conductivity. Zinc oxide is particularly attacked by the molten alkali carbonates often used as an electrolyte at these temperatures, and tends to migrate out of the electrode. It is also readily reduced by hydrogen to the metal which is then volatile at these elevated temperatures. Both nickel oxide and zinc oxide tend to agglomerate during extended operation with a resulting decrease in active surface areas. These electrode catalysts thus show a marked deterioration in performance even over as short an operating time as one thousand hours, while a fuel cell must generally operate at least a year and a half without a change of electrodes to be competitive with other sources of utility power. The noble metals sinter badly in this temperature range.

An important object of this invention is to provide a catalyst for use in an electrode of a fuel cell or the like which may be prepared from relatively inexpensive reagent grade chemicals and incorporated in electrodes using conventional, relatively simple and inexpensive farbrication techniques and yet which performs as efficiently as any known catalyst at the higher operation temperatures.

Another object is to provide a catalyst which can be used in an electrode for a fuel cell system utilizing a molten carbonate as an electrolyte.

A further object is to provide a catalyst which can be efficiently used in the fuel electrode of a fuel cell system using a fuel stream containing hydrogen, carbon monoxide, carbon dioxide, nitrogen and water vapor, and a process for fabricating the electrode.

Another object is to provide an electrode having all of these advantages.

These and other objects are accomplished by the use of barium oxide as a catalyst in an electrode for a porous fuel cell or the like. The catalyst is located in the active region of the electrode which may be used as either the fuel electrode or the oxidant electrode.

In accordance with another aspect of this invention, a porous electrode is provided comprised of a mixture of silver and barium oxide.

In accordance with another aspect of the invention, a process for fabricating the novel electrode comprises sintering silver powder on a porous disk for holding an electrolyte to form a porous body of silver, and impregnating the silver body with barium oxide.

In accordance with another aspect of the invention, the electrode may be fabricated by sintering a mixture of silver particles and barium oxide particles to form a porous body of silver and barium oxide.

The novel features believed characteristic of this invention are set forth in the appended claims. The invention itself, however, as well as other objects and advantages thereof, may best be understood by reference to the following detailed description of illustrative embodiments, when read in conjunction with the accompanying drawing, wherein:

The figure is a simplified cross-sectional view of a typical fuel cell utilizing eltctrodes constructed in accordance with the present invention.

Referring now to the drawing, a typical conventional fuel cell is indicated generally by the reference numeral 10. The fuel cell is comprised of a porous disk 12 which contains a suitable electrolyte. A hydrogen or fuel electrode, indicated generally by the reference numeral 14, is formed on one side of the disk 12, and an oxidant or air electrode, indicated generally by the reference numeral 16, is formed on the other side. The fuel electrode 14 is comprised of porous layers 18 and 20 which, respectively, have relatively small and relatively large pore spaces. The oxidant electrode 16 is similarly comprised of fine and coarse layers 22 and 24. The electrolyte disk 12 partitions a housing comprised of a generally cylindrical wall 26 and end plates 28 and 30 into a fuel chamber 32 and an air chamber 34. Fuel is introduced to the chamber 34 through inlet 36 and flows past the electrode 14 to an outlet 38. Air is introduced to the chamber 34 by inlet 40 and flows past the electrode 16, in the opposite direction to the flow of fuel past electrode 14, to an outlet 42. Electrical contact is made with the fuel electrode 14 through a metallic screen 44 and lead wire 46, which is insulated from the housing by fixture 48. Electrical contact is made with the air electrode 16 by a metallic screen 50 and lead wire 52, which is insulated from the housing by a fixture 54.

The electrolyte which is used to impregnate the porous magnesium oxide disk 12 is typically a carbonate, such as LiNaCO₃, the fuel gas is typically a mixture of free hydrogen, carbon monoxide, carbon dioxide, nitrogen and water, the oxidant is typically air, and the fuel cell is typically operated at about 650° C. In the operation of a fuel cell, the molten electrolyte occupies substantially all of the pore space in the fine layers 18 and 22 of the electrodes, but only wets the walls of the larger pore spaces in the coarse layers 20 and 24. The remainder of the pore spaces in the coarse layers 20 and 24 are occupied by the fuel gases and air, respectively. Thus, the larger pore spaces in the coarse layers 20 and 24 provide large area interfaces between the liquid electrolyte and the fuel and air. It is desirable for the catalyst to be disposed as close to the interface between the electrolyte and respective gases as possible, and for this reason the catalyst is normally disposed so as to form a portion of or all of the walls of the large pore spaces of the layers 20 and 24. The mechanism producing the electrical current generally comprises the production of oxygen ions at the electrode 16, and the combination of the oxygen ions with hydrogen to form water at the electrode 14.

In accordance with the present invention, the catalyst for either or both electrodes 14 and 16 is barium oxide (BaO). The barium oxide catalyst is particularly useful in the fuel electrode 14, but is also useful in the oxidant electrode 16, for a fuel cell using a molten carbonate electrolyte and operating at relatively high temperatures, but is also useful in fuel cells of different types operating at lower temperatures. In accordance with the broader aspects of the invention, an electrode using barium oxide as a catalyst may be of any suitable configuration and may be fabricated using any suitable process.

In accordance with a specific aspect of the invention, an electrode, such as the electrode 14 for example, may be fabricated by flame spraying a thin silver layer onto a porous magnesium oxide disk. For example, the silver layer is exaggeratedly indicated at 60 in the figure. Next 4.0 grams of 120–150 mesh silver powder is spread over the silver sprayed area of the magnesium oxide disk and leveled. Then 4.0 grams of 100–120 mesh silver powder is spread over the first layer of silver powder. A 140 gram disk is then placed on the powders and the powders sintered for about one hour at about 850° C. in argon gas. This results in the formation of the relatively fine pored layer, such as layer 18, and the relatively coarse pored layer, such as layer 20. Then about ten grams of commercial grade barium resinate is thickened by evaporating some of the solvent, and the thickened resinate painted on the surface of the layer 20. The resinate is then dried for about two hours at about 140° C., then baked at about 800° C. for about one hour. As a result, both of the sintered layers are impregnated with barium oxide. Then the film of silver flame sprayed onto the porous disk provides adhesion between the sintered body and the disk, and is sufficiently thin to be porous. The same procedure may then be followed to form the electrode 16 on the opposite side of the porous disk 12 if desired.

A single layer electrode having coarse and fine pores may be formed by blending 0.5 gram of sintered barium oxide of about 200–325 mesh with 4.5 grams of 100–120 mesh silver powder and 0.5 gram of 50–150 mesh ammonium bicarbonate. These powders are spread over an area where the porous magnesium oxide disk 12 has been coated with a very thin layer of flame sprayed silver. A 140 gram disk-shaped weight is then placed on the powder and the powder sintered at about 850° C. for about one hour in an argon atmosphere. This produces a single layered electrode having alternate relatively large and relatively small pore spaces to facilitate both gas-liquid contact and flow of the electrolyte. Thus, the barium oxide is rather uniformly distributed throughout the single layer electrode.

Electrodes utilizing barium oxide as a catalyst may also be fabricated using the methods described generally in copending U.S. application Ser. No. 379,428, entitled, "Porous Reaction Medium and Methods of Making Same," filed on June 22, 1964 by Kurt W. Kreiselmaier, and assigned to the assignee of this application.

A barium oxide impregnated two layered electrode fabricated substantially as described above was used in a fuel cell in which a similar sintered silver electrode, without the barium oxide catalyst, was used as the air electrode. In operation at 600° C. with a lithium sodium carbonate ($LiNaCO_3$) eutectic electrolyte, the cell quickly activated and produced 84 amperes per square foot at 0.7 volt. After seventeen hours of operation, the current density had risen to 96 amperes per square foot at 0.7 volt. Barium oxide has several unique characteristics which, it is believed, make it particularly useful as a catalyst for a fuel cell. Its resistance is unusually low for such a highly ionic oxide. According to Pauling's electronegativity values, barium oxide is 82% ionic, and this is probably related to the ease of formation of barium peroxide from the monoxide above 400° C., which probably contributes to the formation of water from the oxygen and hydrogen ions and the production of electrical energy. The large ionic radius, 1.35 angstroms, of the divalent barium ion is close to that of divalent oxygen, 1.40 angstroms, and probably aids oxide ion mobility in the oxide lattice.

Barium oxide can be easily prepared in a highly dispersed form from relatively inexpensive reagent grade chemicals, such as barium nitrate or carbonate, or from metal resinate compounds, and therefore is a relatively inexpensive catalyst. The resulting high surface area oxide can be sintered at elevated temperatures, having a melting point of 1423° C. to produce a thermally stable compound compatible with the corrosive molten carbonate environment in a high temperature fuel cell. Although particularly useful as a catalyst in a fuel electrode, barium oxide can also be used to advantage in the oxidant electrode, and will in general perform well in fuel cells operating at much lower temperatures with electrolytes other than the molten corbonates. Barium oxide should also be a suitable catalyst for use in other types of fuel cells. For example, a thin film of barium oxide should yield a membrane with good oxide ion mobility at only 500° C., as compared to 1000° C. for zirconia, for use in a high temperature ceramic membrane type fuel cell.

While some porous bodies may be nonpervious to the passage of fluids through the pore spaces of the bodies, as used herein and in the appended claims, a porous body shall be considered as one in which the pore spaces are interconnected so as to permit the migration of fluids through the pore spaces of the body.

Although a preferred embodiment of the invention has been described in detail, it is to be understood that various changes, substitutions and alterations can be made therein without departing from the spirit and scope of the invention as defined by the appended claims.

What is claimed is:
1. A fuel cell comprising an electrode consisting essentially of a sintered porous body which consists essentially of silver impregnated with barium oxide.
2. A fuel cell defined in claim 1, wherein the sintered porous body consists essentially of substantially homogeneously dispersed particles of barium oxide and metallic silver.

References Cited

UNITED STATES PATENTS

| | | | |
|---|---|---|---|
| 2,491,057 | 12/1949 | Nevison et al. | 252—475 XR |
| 2,545,438 | 3/1951 | Stumbock et al. | 29—182.5 XR |
| 3,300,343 | 1/1967 | Huber et al. | 136—86 |

WINSTON A. DOUGLAS, Primary Examiner

A. SKAPARS, Assistant Examiner